(12) United States Patent
Emanuelsson (10) Patent No.: US 10,012,720 B2
(45) Date of Patent: Jul. 3, 2018

(54) LOW REFLECTION RADAR BRACKET

(71) Applicant: VOLVO CAR CORPORATION, Gothenburg (SE)

(72) Inventor: Martin Emanuelsson, Molndal (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 15/173,748

(22) Filed: Jun. 6, 2016

(65) Prior Publication Data

US 2016/0370456 A1 Dec. 22, 2016

(30) Foreign Application Priority Data

Jun. 17, 2015 (EP) ..................................... 15172452

(51) Int. Cl.
| | | |
|---|---|---|
| *A47B 96/06* | (2006.01) | |
| *G01S 7/02* | (2006.01) | |
| *G01S 7/03* | (2006.01) | |
| *G01S 13/93* | (2006.01) | |
| *H01Q 1/52* | (2006.01) | |

(Continued)

(52) U.S. Cl.
CPC ................ *G01S 7/02* (2013.01); *G01S 7/032* (2013.01); *G01S 13/931* (2013.01); *H01Q 1/3233* (2013.01); *H01Q 1/3291* (2013.01); *H01Q 1/528* (2013.01); *H01Q 17/00* (2013.01); *G01S 2007/027* (2013.01); *G01S 2013/9325* (2013.01); *G01S 2013/9332* (2013.01);

(Continued)

(58) Field of Classification Search
USPC ..................................................... 248/205.1
See application file for complete search history.

(56) References Cited

U.S. PATENT DOCUMENTS 4,373,161 A * 2/1983 Matsumura .............. B60Q 1/54
180/167
6,496,138 B1 12/2002 Honma
(Continued)

FOREIGN PATENT DOCUMENTS

EP 0884799 A2 12/1998

OTHER PUBLICATIONS

XP055234515, "5 Reflection and Transmission 5.1 Propagation Matrices", Sep. 20, 2008, http://www.ece.rutgers.edu/~orfanidi/ewa/ch05, pp. 150-182.

(Continued)

*Primary Examiner* — Monica E Millner
(74) *Attorney, Agent, or Firm* — Brooks Kushman P.C.

(57) ABSTRACT

A radar bracket for a vehicle includes a central portion configured to receive a radar module so that the radar module is exposed on a front side of the radar bracket, and a side wall encircling and extending laterally from the central portion and comprising a non-conductive material. At least of a portion of a backside of the side wall is covered by a radar absorbing material having a dielectric constant higher than a dielectric constant of the side wall. The at least a portion of the side wall has a thickness $d_w$ proportional to a quarter of the wavelength of a signal emitted by the radar module, and selected based on the dielectric constants of the side walls of the radar bracket and the radar absorbing material, such that a reflection at the interface between the side wall and the radar absorbing material is effectively cancelled out.

20 Claims, 4 Drawing Sheets

(51) Int. Cl.
*H01Q 17/00* (2006.01)
*H01Q 1/32* (2006.01)

(52) U.S. Cl.
CPC .............. *G01S 2013/9375* (2013.01); *G01S 2013/9378* (2013.01); *G01S 2013/9389* (2013.01)

(56) References Cited

U.S. PATENT DOCUMENTS

| | | | | |
|---|---|---|---|---|
| 6,717,544 | B2* | 4/2004 | Nagasaku | G01S 7/032 342/175 |
| 6,937,184 | B2* | 8/2005 | Fujieda | G01S 7/03 342/1 |
| 7,126,525 | B2* | 10/2006 | Suzuki | G01S 7/03 342/1 |
| 7,145,505 | B2* | 12/2006 | Gottwald | G01S 7/032 342/175 |
| 8,013,775 | B2* | 9/2011 | Woods | H01L 23/552 342/1 |
| 9,110,162 | B2* | 8/2015 | Matsuzawa | H01Q 1/3233 |
| 9,322,953 | B2* | 4/2016 | Narimanov | G02B 1/002 |
| 9,618,615 | B2* | 4/2017 | Inada | B60R 19/483 |
| 9,640,873 | B2* | 5/2017 | Pfitzenmaier | H01Q 17/001 |
| 2002/0067305 | A1* | 6/2002 | LeBlanc | B60K 31/0008 342/198 |
| 2004/0066349 | A1* | 4/2004 | Ohba | H01Q 13/02 343/786 |
| 2004/0227663 | A1 | 11/2004 | Suzuki et al. | |
| 2006/0216442 | A1* | 9/2006 | Kamiya | H01Q 1/3233 428/31 |
| 2012/0007764 | A1* | 1/2012 | Kawasaki | B60R 19/483 342/70 |
| 2013/0185847 | A1* | 7/2013 | Steenson | A41D 31/00 2/243.1 |
| 2014/0070982 | A1 | 3/2014 | Inada et al. | |
| 2014/0091969 | A1* | 4/2014 | Shi | G01S 13/931 342/385 |
| 2015/0109162 | A1* | 4/2015 | Binzer | H01Q 1/3233 342/5 |
| 2015/0123872 | A1 | 5/2015 | Fujita et al. | |
| 2016/0023624 | A1* | 1/2016 | Schaaf | B60R 19/03 293/117 |
| 2016/0297437 | A1* | 10/2016 | Hara | B60R 11/04 |
| 2016/0344095 | A1* | 11/2016 | Tagi | H01Q 1/3233 |

OTHER PUBLICATIONS

Extended European Search Report dated Dec. 17, 2015, Application No. 15172452.3-1812, Applicant Volvo Car Corporation, 6 pages.

* cited by examiner

LOW REFLECTION RADAR BRACKET

CROSS-REFERENCE TO RELATED APPLICATIONS

This application claims foreign priority benefits under 35 U.S.C. § 119(a)-(d) to European patent application number EP 15172452.3, filed Jun. 17, 2015, which is incorporated by reference in its entirety.

TECHNICAL FIELD

The present disclosure relates to a radar bracket for a vehicle. In particular, the present disclosure relates to a low reflection radar bracket.

BACKGROUND

Modern vehicles comprise an increasing number of safety features and automated systems for reducing the risk of accidents. Examples of such features and systems are parking sensors, blind spot monitors, lane keeping systems, systems for automatic cruise control with distance keeping, automated steering systems etc.

Along with the increasing number of fully- or semi-automated systems comes more strict requirements relating to the reliability of such systems. In particular, it is crucial that the systems cannot malfunction or misinform the driver so that the risk of an accident is increased.

Many such systems utilize radar technology for detecting objects in the vicinity of the vehicle, such as other vehicles. However, vehicles are often operated in environments where a radar system provides a large number of echoes making important to be able to detect only the relevant features surrounding the vehicle. Therefore, it is important to reduce the amount of noise, disturbances and spurious echo signals reaching the radar receiver.

Accordingly, it is desirable to provide radar systems which are more reliable and which are not as sensitive to irrelevant and disturbing radar echoes.

US2014/0070982 relates to a vehicle obstacle detection device comprising a radar unit. The radar unit is arranged on a bumper of a vehicle and it has been observed that signals emitted by the radar unit can be reflected in the bumper towards a wheel of the vehicle, where it is reflected back towards the radar unit where it may be misdetected as a target vehicle. US2014/0070982 addresses this problem by suggesting various ways for reducing the reflected echo by arranging a misdetection prevention member between the wheel and the radar unit. The misdetection prevention member may for example comprise a radio wave absorbing material.

However, the above problem and solution only address one of many sources for unwanted echo signals, and there is still a need to further reduce the amount of unwanted echo signals reaching the radar receiver.

SUMMARY

In view of above-mentioned desired properties of a radar system for a vehicle, it is an object of the present disclosure to provide a radar bracket and a radar arrangement reducing the amount of undesirable echo signals reaching a radar module.

According to a first aspect of the disclosure, there is provided a radar bracket for a vehicle comprising: a central portion configured to receive a radar module so that said radar module is exposed on a front side of said radar bracket; a side wall encircling and extending laterally from the central portion, the side wall comprising a non-conductive material; wherein at least of a portion of a backside of the side wall is covered by a radar absorbing material having a dielectric constant higher than a dielectric constant of the side wall, the backside of the side wall being configured to face the vehicle, and wherein the portion of the side wall being covered by the radar absorbing material has a thickness $d_w$ defined as $$d_w = \frac{(2m+1)}{\sqrt{\epsilon_w}} \frac{\lambda_0}{4}, \epsilon_{abs} \approx \epsilon_w^2,$$

where $\lambda_0$ is a wavelength in air of a center frequency of the radar module, $\epsilon_{abs}$ is the dielectric constant of the radar absorbing material, $\epsilon_w$ is the dielectric constant of the side wall and m=0 . . . N.

In the present context, a radar bracket could also be referred to as a radar holder, or a radar frame, which is configured to hold the radar module in place when the radar bracket with a radar module is arranged in a vehicle. For example, the radar bracket may be configured to be attached on the inside of a front or rear bumper of a vehicle. Moreover, the central portion is configured to receive the radar module so that the radar module emits signal in a direction away from the vehicle when the radar bracket and radar module is arranged in a vehicle. The side of the radar bracket configured to face away from the vehicle can thus be referred to as the front side of the bracket, as opposed to the backside of the radar bracket configured to face in a direction towards the vehicle.

That the side wall extends laterally from the central portion does not exclude that the side wall, or portions of the side wall, also extend in directions which are not uniformly lateral. In other words, the side wall has a lateral extension in relation to the central portion, and it may also have an extension in the horizontal direction.

The dielectric constants are here given as the relative dielectric constants. Since m is a positive integer (e.g., 0, 1, 2, 3 . . . N), the thickness $d_w$ of the side wall is proportional to an odd multiple of a quarter of the wavelength in air of a center frequency of said radar module.

The side wall of the bracket is made from a non-conductive material, i.e., a non-metallic material, having a known and/or controllable dielectric constant. Preferably, also the remaining portions of the bracket are made from a non-conductive material, which may be the same material as the side walls. For example, the entire bracket may be molded in one piece. Also portions of the side wall which is not covered by the radar absorbing material may have the same thickness as described above. Alternatively, the thickness of the remaining portions of the side wall may be selected arbitrarily.

It is known to use radar absorbing materials for radars in vehicles for reducing the amount of undesirable echo reflections reaching the radar receiver. However, a radar absorbing material typically has a relatively high dielectric constant, often higher than five. This means that when an electromagnetic wave travelling in air reaches the radar absorbing material, a portion of the signal will be reflected at the interface between air and the absorber as a result of the difference in dielectric constant. In principle, the magnitude of the reflected signal is proportional to the difference in dielectric constants, while the absorption of radar absorbing material is roughly proportional to the dielectric constant. Accordingly, a higher absorption in the radar absorbing material would at the same time lead to an increased reflection. Accordingly, even if a radar absorbing material can be used to reduce unwanted echoes, it may also introduce new echo signals reaching the radar receiver.

In view of the above, the present disclosure is based on the realization that a reflected signal from a radar absorbing material can be substantially reduced by arranging a material having a known dielectric constant adjacent to the radar absorbing material, here the side wall of the radar bracket, and by selecting the thickness of the side wall in relation to the dielectric constants so that reflections from the radar absorbing material are cancelled out in the side wall. The reflections on the side wall surface and on the surface of the radar absorbing material have the same sign, since both are reflected when reaching an interface with higher dielectric constant. However, for an arbitrary thickness of the side wall, the reflections are added together at a random phase. Selecting a side wall having a dielectric thickness equal to an odd multiple of the quarter wavelength leads to a phase shift so that the reflection from the second surface add destructively to the first reflection. The reflection amplitudes are matched to be equal when $\varepsilon_w = \sqrt{\varepsilon_{abs}\varepsilon_{air}}$, $\varepsilon_{air}=1$, in other words when $\varepsilon_{abs}=\varepsilon_w^2$.

Within the field of electromagnetics, the concept is referred to as a reflectionless slab. As can be seen from the described relations, assuming that the frequency of the radar module is fixed, there are three parameters which can be tuned to achieve the desired result, the dielectric constants of the side wall and the radar absorbing materials and the thickness of the side wall. As an example, if it is known which materials to use, the thickness of the side wall is selected accordingly. Alternatively, the material and thickness of the sidewall may be fixed, within reasonable limits, and the dielectric constant of the radar absorbing material can be tuned accordingly.

Thereby, through the radar bracket of the present disclosure, a dual advantageous effect is achieved since the amount of secondary echo signals reflected in the own vehicle is reduced, and at the same time reflections from the radar absorbing material is reduced.

The radar absorbing material can for example be provided in the form of an adhesive tape being attached to suitable locations on the backside of the side wall.

According to one embodiment of the disclosure, the dielectric constant of the side wall may be in the range of 2 to 3. It is desirable to select the dielectric constant of the side wall to not be too high in order to as much as possible reduce reflections at the interface between air and the side wall.

In one embodiment of the disclosure, the dielectric constant of the radar absorbing material may advantageously be in the range of 4 to 9. For many radar absorbing materials, the dielectric constant can be selected within a certain interval. Here, the dielectric constant is typically selected to provide a reasonable trade-off between absorption and reflection at the interface between the side wall and the absorbing material.

According to one embodiment of the disclosure, a thickness of the radar absorbing material may advantageously be selected so as to achieve at least a 10 dB reduction in signal strength for a one way passage through the material. This means that a signal passing through the absorbing material, reflects in the vehicle before again passing through the absorbing material and the side wall will be reduced by 20 dB, which in most cases is sufficient to avoid disturbing the radar receiver.

Furthermore, for known radar absorbing materials, a thickness in the range of 1.5 to 4 mm is typically sufficient for providing at least 10 db attenuation.

According to one embodiment of the disclosure, the side wall material may be a plastic material. Plastic materials are advantageously used since they are comparably cheap, they can be made in practically any shape, and the dielectric constant of a plastic material is to some extent controllable or can at least be well defined. As discussed above, the entire radar bracket can be made from one and the same material. Thermoplastics can be tailored to a wide range of dielectric constants, from 2 to more than 12, and thus different attenuation and reflection performance can be achieved. Commonly used materials on the market for automotive use have dielectric constants in the range of 6-12.

In one embodiment of the disclosure, the central portion may be recessed with respect to the side wall. In that case, the radar module is arranged in the recess so that the radar module does not protrude above a plane defined by the outmost part of the front of the module. Such a configuration may be advantageous since it allows the front of the radar bracket to be fixed directly to an inside of a bumper, which for example may be done by welding. Alternatively, the radar bracket may be configured so that the radar module may be arranged in the bracket to protrude from the side wall, i.e., the front portion of the radar module is located in a plane higher than a plane defined by the side wall. This may for example be advantageous if the radar bracket is a part of the body of the vehicle.

According to one embodiment of the disclosure, at least a portion of the side wall may be arranged to slope away from the central portion in a direction towards a front side of the bracket.

Moreover, the central portion may advantageously have a substantially rectangular shape, and the side wall may then be arranged to slope away from the central portion at two opposing sides of the central portion, the two sides being configured to be horizontally aligned when the radar bracket is arranged in a vehicle.

The preferred configuration of the radar bracket depends on the lobe shape of the radar module. Typically, a radar module for a vehicle has a lobe shape which much wider in the horizontal plane than in the vertical plane. The reason for this being that it is important to detect objects surrounding the vehicle, typically other vehicles, which are located in substantially the same horizontal plane as the vehicle, while it is less relevant to detect objects in the vertical plane.

Assuming that the radar module is configured to have a lobe having a substantially larger extension in the horizontal plane than in a vertical plane, the bracket is preferably configured so that the side walls do not interfere with the lobe. Thus, the side walls slope away from the central portion in the horizontal plane to accommodate the wide lobe, whereas the side walls may be less sloped, or not sloped at all, at the sides of the radar module being located in the vertical plane.

According to one embodiment of the disclosure, the radar absorbing material is preferably covering a backside of the sides of the side wall arranged to slope away from said central portion. The sloping portions of the side wall will also have the effect that echo signals from that surface will be directed towards the radar module. Thus it is particularly relevant to reduce the amount of reflections from the sloped side walls, which can be achieved be covering the backside of the sloped portions with the radar absorbing material and selecting the thickness of the side wall as discussed above.

According to a second aspect of the disclosure, there is provided a radar arrangement comprising a radar bracket according to any one of the embodiments described above and a radar module arranged in the central portion of the radar bracket.

The radar module may be configured to emit signals in the frequency bands 24.00-24.25 and 76-81 GHz, which are common frequencies to use for radar modules in automotive applications. As one skilled in the art would understand, a center frequency of the radar module could then be any frequency within a particular band, including an end frequency. For example, a center frequency could be set at 76.4 GHz if the radar module uses a +/−400 MHz bandwidth.

Furthermore, the radar module may advantageously be configured to have a main lobe having a beam width in the range of 30° to 160° in the horizontal plane, and a beam width in the range of 3° to 20° in the vertical plane.

Further features and advantages of the second aspect of the disclosure are analogous to advantages discussed in relation to the first aspect of the disclosure.

There is also provided a vehicle comprising a radar bracket and/or a radar arrangement according to any one of the embodiments discussed above.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the attached drawings.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the radar bracket according to various embodiments will be described with reference to the above described drawings.

Figure 1:
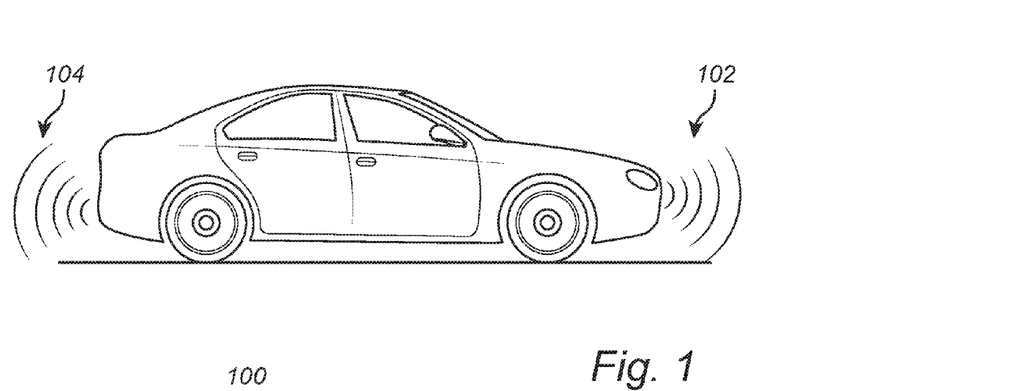
FIG. 1 schematically illustrates a vehicle comprising a radar bracket according to an embodiment of the disclosure.

FIG. 1 schematically illustrates a vehicle 100 equipped with one or more radar brackets according to various embodiments of the disclosure. The radar brackets comprising radar modules may be used for various applications in the vehicle, such as in a forward looking radar arrangement for distance keeping or obstacle detection in collision prevention systems, or as a rear radar arrangement for blind spot warning systems.

Figure 2:
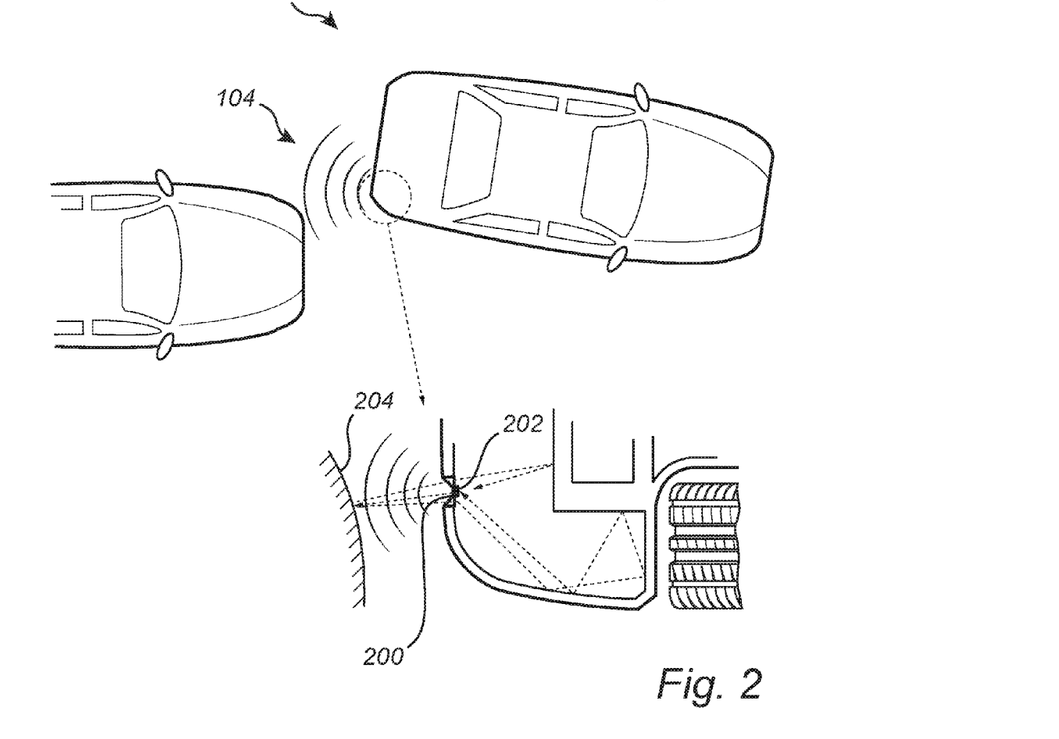
FIG. 2 schematically illustrates a radar arrangement in a vehicle.

FIG. 2 schematically illustrates a radar arrangement 200 in a vehicle 100 where the radar arrangement is provided for a blind-spot warning system configured to detect a vehicle 201 located in the blind spot of the driver. FIG. 2 further illustrates the reflection of emitted signals emitted from the radar module 202. The emitted signals are reflected by an object 204, such as a vehicle 201, and the reflected signals are received by the radar module 202. However, a portion of the reflected signals reaching the vehicle may also be reflected by different portions of the vehicle towards the radar module. Moreover, signals reaching the radar module may also be reflected in the side walls of the radar bracket 200. Thus, it is desirable to reduce the amount of reflected signals reaching the radar module which does not originate from a reflection at an obstacle located in the emission direction of the radar. One approach for reducing reflections is to arrange a radar absorbing material on selected portions of the radar bracket in order to dampen a radar signal as it passes through the radar bracket. Moreover, radar signals may be reflected as they reach the radar absorbing material, since it involves a transition to a material having a higher dielectric constant, which is addressed by the radar bracket according to various embodiments of the present disclosure.

Figure 3A:
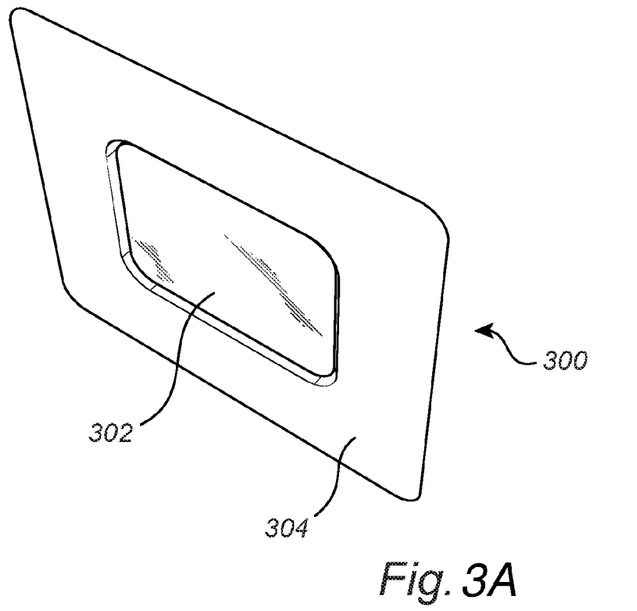
FIGS. 3A-B schematically illustrate radar brackets and radar arrangements according to embodiments of the disclosure.

FIG. 3A is a schematic illustration of a radar bracket 300 according to an embodiment of the disclosure. The radar bracket 300 comprises a central portion housing a radar module 302. In the radar bracket 300 in FIG. 3A, the central portion is recessed so that the front surface of the radar module 302 is located slightly below the plane of the side walls 304 defining the front portion of the radar bracket. The radar module 302 may also be arranged in the same plane as the front portion of the radar bracket 300. The radar bracket 300 and radar module 302 are configured so that the shown front surface of the radar module 302 is arranged facing away from the vehicle when arranged in a vehicle. It can be seen that the side walls 304 encircle the central portion and extend laterally from the central portion to form an opening such that a radar module 302 can be arranged in the central portion so that it is exposed on a front side of the radar bracket 300. The side walls 304 of the radar bracket are made from a non-conductive material which for example can be a plastic material. A radar absorbing material (not shown) is arranged on the backside of the side wall. The radar absorbing material may be arranged on the entire backside surface of on the side wall or on selected portions only where the dampening effect is most desirable. The radar absorbing material can for example be provided in the form of a film, or tape, attached to the side wall by means of an adhesive.

Figure 3B:
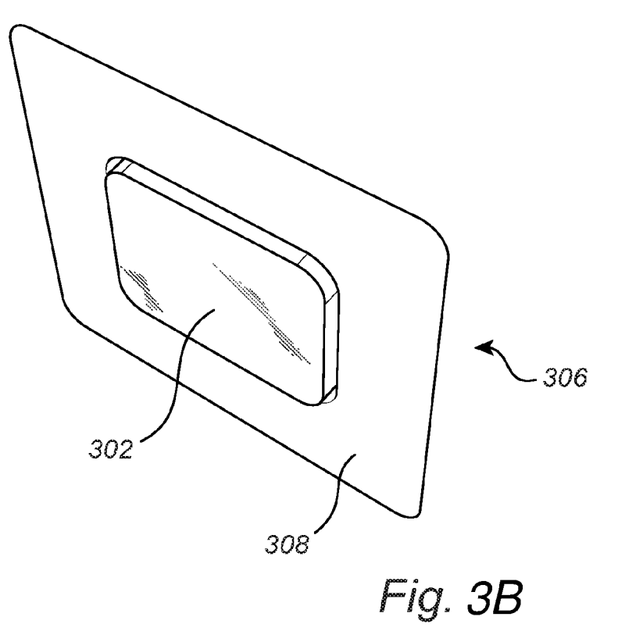

FIG. 3B is a schematic illustration of a radar bracket 306 according to an embodiment of the disclosure. The radar bracket 306 comprises a central portion housing a radar module 302. In the radar bracket 300 in FIG. 3B, the central portion is elevated so that the front surface of the radar module 302 is located slightly above the plane of the side walls 308 defining the front portion of the radar bracket. The radar bracket 300 and radar module 302 are configured so that the shown front surface of the radar module 302 is arranged facing away from the vehicle when arranged in a vehicle. It can be seen that the side walls 304 encircle the central portion and extend laterally from the central portion such that a radar module 302 can be arranged in the central portion so that it is exposed on a front side of the radar bracket 300. As illustrated in the present example, the central portion may comprise only an opening for receiving the radar module.

Figure 4:
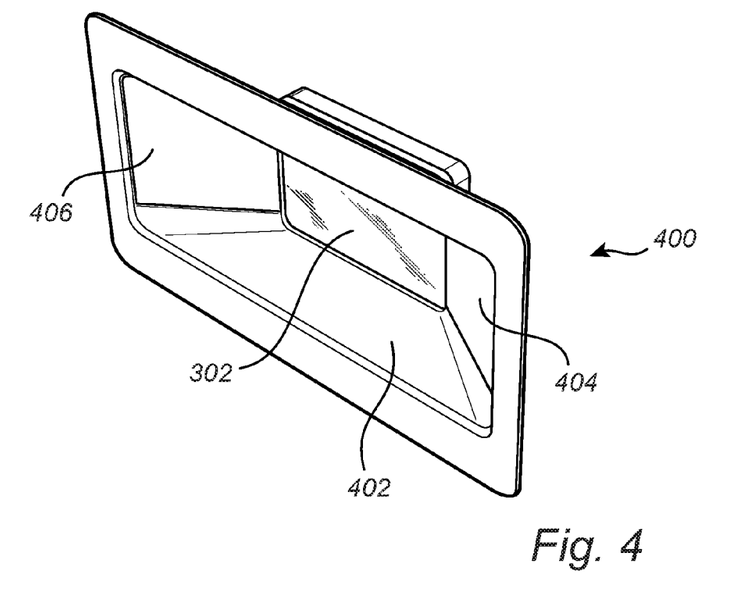
FIG. 4 schematically illustrates a radar bracket and a radar arrangement according to embodiments of the disclosure.

FIG. 4 is a schematic illustration of a radar bracket 400 according to an embodiment of the disclosure. The radar bracket 400 comprises a central portion housing a radar module 302. In the radar bracket 400 in FIG. 4, the central portion has a substantially rectangular shape, and side wall 402 is arranged to slope away from central portion at two opposing sides 404, 406 of the central portion. The two sloping portions 404, 406 of the side wall are configured to be horizontally aligned when the radar bracket 400 is arranged in a vehicle. The slope of the side walls is related to the lobe shape of the radar module 302 as will be discussed in relation to FIG. 6A-B. Also here, a radar absorbing material (not shown) is arranged on the backside of the side wall. Typically, the radar absorbing material may be arranged on the backside of the sloping portions 404, 406 of the side wall, since it is most desirable to reduce the reflections which are most likely to reach the radar module. In the radar bracket illustrated in FIG. 4, the sloping portions 404, 406 of the side wall are straight. Alternatively, the side walls may curve away from the central portion of the radar bracket in different ways. Furthermore, many different configurations of the side walls are feasible while still adhering to the general inventive concept relating to the thickness of the side wall for reducing reflections.

Figure 5:
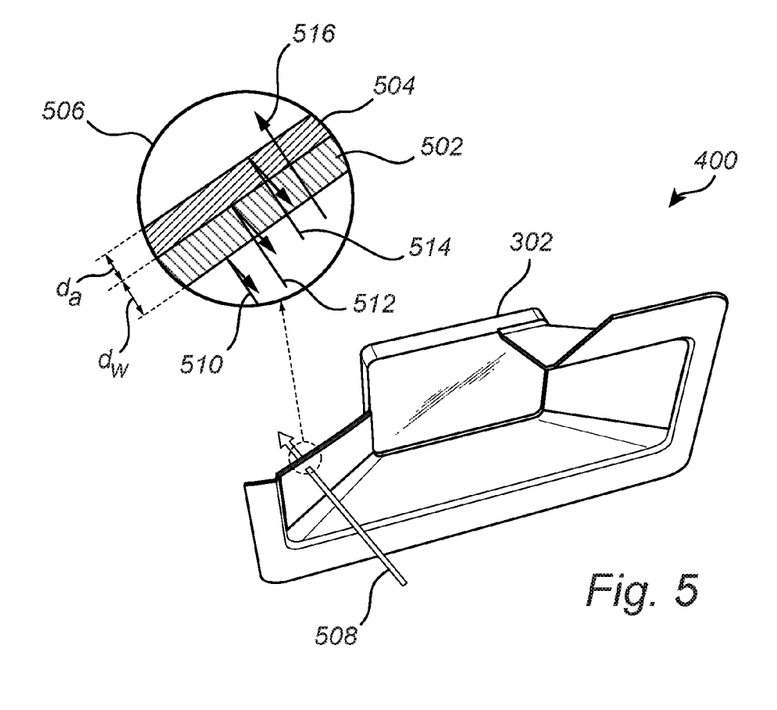
FIG. 5 schematically illustrates details of a radar bracket and a radar arrangement according to embodiments of the disclosure.

FIG. 5 is a schematic illustration of the radar bracket of FIG. 4, illustrating the thickness $d_w$ of a portion the side wall 502 and the thickness $d_a$ of the radar absorbing material 504 arranged on the backside of the side wall. The cut-out portion 506 of FIG. 5 further illustrates various reflections occurring as a radar signal reaches and passes through the side wall 502 and the radar absorbing material 504. A portion of an incoming radar signal 508 reaching the side wall is first reflected 510 at the sidewall due to the interface between air and the side wall 502, where air has a dielectric constant of 1 and the side wall 502 has a dielectric constant in the range of 2 to 3, in the case of a polypropylene side wall 502.

Next a portion of the signal reaching the interface between the side wall 502 and the radar absorbing material 504 is reflected 512. In the radar absorbing material 504, the signal is dampened. The amount of dampening is proportional to the thickness of the radar absorbing material, and for the suggested application, a dampening of about 10 dB is sufficient for a single passage through the material 504, which can be achieved by a thickness $d_a$ in the range of 1-2 mm. Even though the signal is dampened, a portion reaches through the material to be reflected 514 at the interface between the radar absorbing material 504 and air, and the remainder of the signal 516 passes through radar absorbing material 504.

The thickness $d_w$ of the side wall 504 is defined as $$d_w = \frac{(2m+1)}{\sqrt{\epsilon_w}} \frac{\lambda_0}{4}, \epsilon_{abs} \approx \epsilon_w^2$$

where $\lambda_0$ is the wavelength in air of a center frequency of the radar module, $\epsilon_{abs}$ is the dielectric constant of said radar absorbing material, $\epsilon_w$ is the dielectric constant of the side wall and m=0 . . . N. Thereby, by selecting the side wall to have a thickness proportional to an odd multiple of the quarter wavelength, a phase shift occurs so that the reflection 512 from the interface between the side wall 502 and the radar absorbing material 504 adds destructively to the reflection 510 occurring at the interface between air and the side wall 502. In practice, the reflection 514 at the interface between the radar absorbing material 504 and air can be neglected since the attenuation is selected to be sufficiently high so that the reflection 514 is significantly lower than the combined remaining reflections.

As a practical example, the side wall can be made from polypropylene having a dielectric constant $\epsilon_w$=2.5, which gives a dielectric constant of the radar absorbing material $d_a$=6.25. A typical frequency for a radar in vehicle application is f=77 GHz, which gives the wavelength $\lambda_0$=c/f=3.9 mm, c being the speed of light. Moreover, it can be seen that a higher m leads to a higher value of $d_w$. In the present example selecting m=2 gives a side wall thickness $d_w$=3 mm which is a reasonable thickness for the side wall 502 in the radar bracket 400. The skilled person realizes that the above description is equally applicable for a large range of parameter values relating to the dielectric constants, frequency and thicknesses of materials.

It should be noted that only the thickness of the side wall where a radar absorbing material is arranged is selected as described above. Remaining portions of the side wall and of the radar bracket may have a thickness selected based on the required structural and mechanical properties.

Figure 6A:
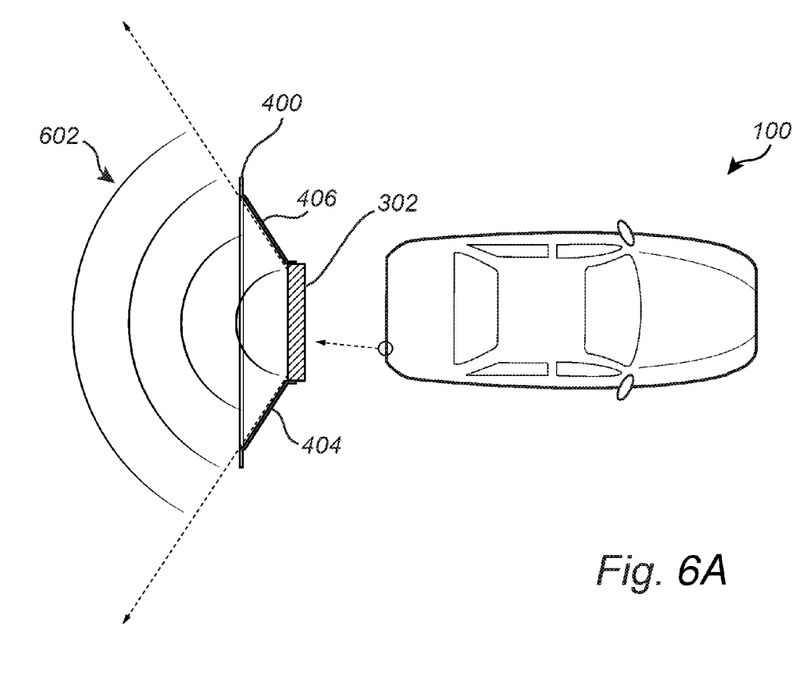
FIGS. 6A-B schematically illustrate a radar bracket, a radar arrangement and a vehicle according to embodiments of the disclosure.
Figure 6B:
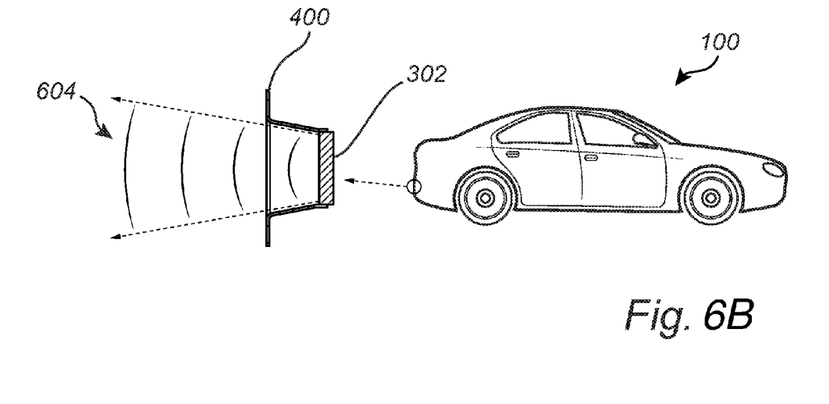

FIGS. 6A-B schematically illustrate the radar bracket 400 in a top view, FIG. 6A, and in a side view, FIG. 6B, in order to illustrate the lobe shape of the radar module. The combination of steep side walls with a wide lobe would cause additional undesirable reflections. Accordingly, the configuration of the side walls of the radar bracket 400 are selected with respect to the lobe shape of the radar module so that the emitted signal does not reflect off the side wall when leaving the radar module 302 and radar bracket 400.

The main lobe of a radar module for vehicle applications may have a lobe having a beam width 602 in the range of 140° to 160° in the horizontal plane, as illustrated in FIG. 6A. Thus, the side walls 404, 406 of the radar bracket 400 are arranged to slope away from the radar module 302 in the horizontal plane so that the radar beam may leave the radar bracket 400 unobstructed.

FIG. 6B illustrates the radar module 400 as seen from the side. In the vertical plane, the beam width 604 of the radar module 302 is significantly smaller, such as in the range of 5° to 20°, since it is most important to detect obstacles located in the same horizontal plane as the vehicle 100.

Even though the disclosure has been described with reference to specific exemplifying embodiments thereof, many different alterations, modifications and the like will become apparent for those skilled in the art. Also, it should be noted that parts of the radar bracket may be omitted, interchanged or arranged in various ways, the radar bracket yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A radar bracket for a vehicle comprising:
   a central portion configured to receive a radar module so that the radar module is exposed on a front side of the radar bracket, the front side being configured to face away from the vehicle when the radar bracket is mounted on the vehicle; and
   a side wall connected to the central portion and encircling and extending laterally from the central portion, the side wall comprising a non-conductive material and including a front surface that is exposed on the front side of the radar bracket, and a backside that is configured to face the vehicle;
   wherein at least a portion of the backside of the side wall is covered by a radar absorbing material having a dielectric constant higher than a dielectric constant of the side wall, and wherein the at least a portion of the backside of the side wall covered by the radar absorbing material has a thickness $d_w$ defined as $$d_w = \frac{(2m+1)}{\sqrt{\epsilon_w}} \frac{\lambda_0}{4}, \epsilon_{abs} \approx \epsilon_w^2$$

where $\lambda_0$ is the wavelength in air of a center frequency of the radar module, $\epsilon_{abs}$ is the dielectric constant of the radar absorbing material, $\epsilon_w$ is the dielectric constant of the side wall and m=0 . . . N.

2. The radar bracket according to claim 1 wherein the dielectric constant of the side wall is in the range of 2 to 3.

3. The radar bracket according to claim 1 wherein the dielectric constant of the radar absorbing material is in the range of 4 to 9.

4. The radar bracket according to claim 1 wherein a thickness of the radar absorbing material is selected so as to achieve at least a 10 dB reduction in signal strength for a one way passage through the material.

5. The radar bracket according to claim 1 wherein a thickness of the radar absorbing material is in the range of 1.5 to 4 mm.

6. The radar bracket according to claim 1 wherein the side wall material is a plastic material.

7. The radar bracket according to claim 1 wherein the central portion is recessed with respect to the side wall.

8. The radar bracket according to claim 7 wherein at least a portion of the side wall is arranged to slope away from the central portion in a direction towards the front side of the bracket, wherein the slope of the sidewall is related to lobe shape of the radar module.

9. The radar bracket according to claim 1 wherein the central portion has a substantially rectangular shape, and wherein the side wall includes two portions arranged to slope away from the central portion at two opposing sides of the central portion, the two portions being configured to be horizontally aligned when the radar bracket is arranged in the vehicle, wherein the slope of the two portions is related to lobe shape of the radar module.

10. The radar bracket according to claim 9 wherein the radar absorbing material covers a backside of the portions of the side wall arranged to slope away from the central portion.

11. A radar arrangement comprising:
    the radar bracket according to claim 1; and
    a radar module arranged in the central portion of the radar bracket.

12. The radar arrangement according to claim 11 wherein the radar module is configured to emit signals in the following frequency bands: 24-24.25 and 76-81 GHz.

13. The radar arrangement according to claim 11 wherein the radar module is configured to have a main lobe having a beam width in the range of 30° to 160° in a horizontal plane, and a beam width in the range of 3° to 20° in a vertical plane.

14. A vehicle comprising a vehicle body and the radar bracket according to claim 1 connected to the vehicle body.

15. A vehicle comprising a vehicle body and the radar arrangement according to claim 11, wherein the radar bracket of the radar arrangement is connected to the vehicle body.

16. A radar bracket for a vehicle comprising:
    a central portion configured to receive a radar module so that the radar module is exposed on a first side of the radar bracket, the first side being configured to face away from the vehicle when the radar bracket is mounted on the vehicle; and
    a side wall connected to the central portion and encircling and extending laterally from the central portion, the side wall comprising a non-conductive material and including a first surface that is exposed on the first side of the radar bracket, and a second surface that is configured to face the vehicle when the radar bracket is mounted on the vehicle;
    wherein at least a portion of the second surface of the side wall is covered by a radar absorbing material having a dielectric constant higher than a dielectric constant of the side wall, and wherein the at least a portion of the second surface of the side wall covered by the radar absorbing material has a thickness $d_w$ defined as $$d_w = \frac{(2m+1)}{\sqrt{\epsilon_w}} \frac{\lambda_0}{4}, \epsilon_{abs} \approx \epsilon_w^2$$

where $\lambda_0$ is the wavelength in air of a frequency of the radar module, $\epsilon_{abs}$ is the dielectric constant of the radar absorbing material, $\epsilon_w$ is the dielectric constant of the side wall and m is a positive integer.

17. The radar bracket according to claim 16 wherein the dielectric constant of the side wall is in the range of 2 to 3.

18. The radar bracket according to claim 16 wherein the dielectric constant of the radar absorbing material is in the range of 4 to 9.

19. The radar bracket according to claim 16 wherein at least a portion of the side wall is arranged to slope outwardly away from the central portion, wherein the slope of the sidewall is related to lobe shape of the radar module.

20. The radar bracket according to claim 16 wherein the central portion has a substantially rectangular shape, and wherein the side wall includes two portions arranged to slope away from the central portion at two opposing sides of the central portion, the two portions being configured to be horizontally aligned when the radar bracket is arranged in the vehicle, wherein the slope of the two portions is related to lobe shape of the radar module.

* * * * *